United States Patent [19]

Yamanaka et al.

[11] Patent Number: 5,380,540
[45] Date of Patent: Jan. 10, 1995

[54] METHOD FOR IMPROVING FLAVOR OF DRINK OR FOOD

[75] Inventors: Tohr Yamanaka; Katsumi Tsunoda, both of Kanagawa, Japan

[73] Assignee: Takasago International Corporation, Tokyo, Japan

[21] Appl. No.: 63,340

[22] Filed: May 19, 1993

[30] Foreign Application Priority Data

May 21, 1992 [JP] Japan .................................. 4-153065

[51] Int. Cl.$^6$ .............................................. A23L 1/226
[52] U.S. Cl. .................................... 426/534; 426/538; 426/649; 426/66; 426/590; 426/650
[58] Field of Search ................ 426/66, 538, 590, 650, 426/534, 649

[56] References Cited

U.S. PATENT DOCUMENTS 4,616,016  10/1986  Lechtken et al. .................... 514/249

FOREIGN PATENT DOCUMENTS

| | | |
|---|---|---|
| 53-86068 | 7/1978 | Japan . |
| 61-70944 | 4/1986 | Japan . |
| 61-108351 | 5/1986 | Japan . |
| 61-119140 | 6/1986 | Japan . |
| 61-216657 | 9/1986 | Japan . |
| 63-3766 | 1/1988 | Japan . |
| 63-137658 | 6/1988 | Japan . |
| 2-53456 | 2/1990 | Japan . |

OTHER PUBLICATIONS

*Nogei Kagaku Kaishi,* 46, 137–145 (1972).
*Seito Gijutsu Kenkyu Kaisha,* 22, 65–76 (1970).
*Adv. in Carbohydr. Chem. & Biochem.,* 46, 273–326 (1988).
*J. Cryst. Struct.,* 1, 25–32 (1971).
*Nippon Kagaku Zasshi,* 91, 1098–1099 (1970).
*Beilsteins Handbunch der Organischem Chemie,* EIV. 4146, ibid, EIII, 1, 3313.
G. Hesse, F. Ramissch, K. Kenner, Ber., 89, 2143 (1956).
*Beilsteins Handbuch der Organischem Chemie,* EIII, 1, 3310–3312.

*Primary Examiner*—Joseph Golian
*Attorney, Agent, or Firm*—Sughrue, Mion, Zinn, Macpeak & Seas

[57] ABSTRACT

A method for improving the flavor of a drink or a food is disclosed, which comprises adding at least one compound selected from among monomers and polymers of triose-reductone, hydroxymalon-dialdehyde and hydroxypyruvaldehyde to the drink or food at a ratio of from 50 to 10,000 ng per gram of the drink or food. According to the present invention, the addition of at least one compound selected from among monomers and polymers of triose-reductone, hydroxymalondialdehyde and hydroxypyruvaldehyde to a drink or a food at a specific ratio makes it possible to enhance the saltiness of said food, to modify its sourness, to impart to and enhance its full-bodied flavor and to improve the volatilization of its aroma, thus improving the flavor of the food. It is also possible thereby to prevent the deterioration in the flavor.

3 Claims, No Drawings

METHOD FOR IMPROVING FLAVOR OF DRINK OR FOOD

FIELD OF THE INVENTION

This invention relates to a method for improving the flavor of a drink or a food. More particularly, it relates to a method wherein the flavor of a food such as drinking water or a drink is improved by adding a compound having the functions of enhancing the expression of saltiness of the food, modifying the sourness thereof, imparting a full-bodied flavor thereto, promoting the volatilization of the aroma thereof and preventing the deterioration of the flavor thereof through an antioxidant action without injuring the inherent flavor of the food.

BACKGROUND OF THE INVENTION

In recent years, we have taken a growing interest in health and it is known that excessive intake of salt injures our health. Accordingly, there have been proposed methods for relieving a decrease in saltiness due to the reduction in salt content. For example, JP-A-63-137658 (the term "JP-A" as used herein means an "unexamined published Japanese patent application") proposes a method for enhancing the saltiness of a food comprising adding thaumatin in an amount of from 1/1,000 to 1/10,000 that of salt; JP-63-3766 proposes a method comprising adding collagen, which contains 1 to 4% by weight of a collagen hydrolysate and has a molecular weight of from 2,000 to 5,000, to a food at a ratio of 10% or below based on the whole food; and JP-A-2-53456 proposes a method comprising hydrolyzing a mixture of black koji-mold with yellow green koji-mold and adding the digested liquid thus obtained to a food.

However, the method described in JP-A-63-137658 has a disadvantage that thaumatin employed therein is a sweetener and, therefore, the ratio of this additive to salt is limited. Each of the methods described in JP-A-63-3766 and JP-A-2-53456 requires one to purify and fractionate the active components in order to eliminate an offensive taste and an offensive odor. In addition, the active components employed therein are in the form of a mixture. Namely, no single substance capable of enhancing saltiness is disclosed therein.

On the other hand, it has been required to conveniently provide drinking water, drinks and foods which are delicious and highly safe. However the inherent flavors of these products are frequently deteriorated due to processing or cooking treatments. Accordingly, there have been proposed methods for modifying tastes so as to give the original flavors of these drinks and foods.

Examples of methods for the production of widely usable substances having a full-bodied flavor include a method which comprises extracting root crops, eliminating aroma components from the extract and concentrating or drying the residue to thereby give a mixture containing a substance capable of imparting a full-bodied flavor (refer to JP-A-53-86068) and another method which comprises electrodialyzing molasses optionally together with cheese whey and concentrating or drying the electrolytic components to thereby give a mixture containing a substance capable of imparting a full-bodied flavor (refer to JP-A-61-216657). However, the substances giving a full-bodied flavor obtained by these methods have never been identified though they have been obtained in the form of a mixture. Namely, none of these inventions relates to a single substance capable of expressing a full-bodied flavor.

That is to say, there hats been known no saltiness-enhancing substance which not only enhances the expression of the saltiness of any food (for example, drinking water, drinks, foods) to thereby enable salt-reduction but also has composite functions of imparting or enhancing a full-bodied flavor through synergistic effects of a function of enhancing the saltiness with another function of modifying sourness, promoting the volatilization of aroma and preventing the deterioration in the flavor of the food due to oxidation to thereby activate the original flavor of the food.

Triose-reductone is contained in foods obtained from natural materials [*Nogei Kagaku Kaishi*, 46, 137-145 (1972)] and blackstrap molasses [*Seito Gijutsu Kenkyu Kaishi*, 22, 65-76 (1970)]. It is also formed as an alkaline decomposition product from monosaccharides and polysaccharides [*Adv. in Carbohydr. Chem. & Biochem.*, 46, 273-326 (1988)]. Even if this compound is contained as one of the components in the mixture as described in the above-mentioned JP-A-61-216657, its content therein is limited and it has a low titer. In addition, troublesome purifying procedures are needed in order to remove the offensive taste or odor and, furthermore, the compound is obtained at only a low yield. When the above-mentioned mixture contains various components in addition to this compound, in particular, said mixture is hardly usable in products which should not show any offensive taste or odor (for example, drinking water, drinks and fruit juice).

As the following formulae show, triose-reductone exists as a resonance hybrid (1), a cis-isomer (1-a) and a trans-isomer (1-b). Usually, it is in the form of the solid trans-isomer (1-b). In a solution, it exists as the trans-isomer (1-b) and the resonance hybrid (1) wherein hydroxymalondialdehyde forms an intramolecular hydrogen bond together with the cis-isomer (1-a). Namely, hydroxymalondialdehyde does not exist alone [F. Frimmel, H. P. Fritz, C. G. Kreiter, *J. Cryst. Struct.*, 1, 25-32 (1971)]. Therefore, a hydroxyl group proton in the resonance hybrid (1) is equivalent in an aqueous solution [Obata and Tokuyama, *Nippon Kagaku Zasshi*, 91, 1098-1099 (1970)] and very easily dissociates to thereby give an acidity comparable to acetic acid. It forms mono- to trivalent salts together with metal ions [*Beilsteins Handbunch der Organischem Chemie*, EIV, 4146, ibid., EIII, 1, 3313].

Triose-reductone and hydroxymalondialdehyde represented by the following formula (2) and hydroxypyruvaldehyde represented by the following formula (3) are tautomers. Hydroxypyruvaldehyde exists either as a monomer or as a polymer. Triose-reductone is formed via an irreversible isomerization of hydroxypyruvaldehyde in the presence of an alkali and reduces silver, bromine and iodine ions in solutions [G. Hesse, F. Ramissch, K. Kennet, Ber., 89, 2143 (1956)].

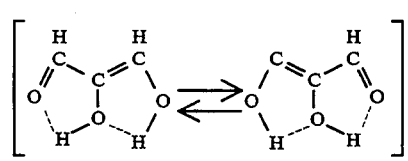

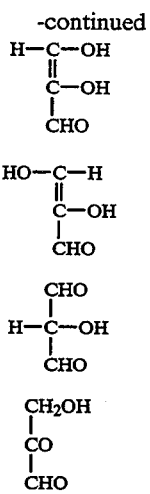

The most important point resides in that there have never been known the functions of the compound, which exists in the above-mentioned state in a solution, of modifying and enhancing the expression of the saltiness of drinking water, drinks or foods containing water, modifying sourness into a sharp taste just like umeboshi (plum pickles), imparting or enhancing the full-bodied flavor through synergistic effects of modifying both the saltiness and sourness and promoting the volatilization of an aroma.

The present inventors have previously found out that when monomers or polymers of α-hydroxyketone derivatives such as hydroxyacetaldehyde, glyceraldehyde, acetoin, acetol, 2-hydroxpropionaldehyde, 3,4-dihydroxy-2-butanone and 1,3-dihydroxyacetone are either singly or combinedly added either as such or as a solution to drinking water, a drink or a food containing water at a ratio of from 50 to 10,000 ng per gram of the food, the saltiness of the food is modified into a mild and full-bodied one while the sourness thereof is modified into a sharp and full-bodied one just like umeboshi. Thus they have found a novel flavor-modifying substance capable of imparting to a food and enhancing the full-bodied flavor of a food via synergistic effects of modifying the saltiness and sourness thereof. Further, they have developed a method for improving the flavor of a drink or a food by using said compound.

Subsequent studies have brought about the completion of the present invention. The compound according to the present invention not only maintains a preferable intensity of saltiness, even though the salt content of a food is reduced, but also imparts to and enhance the full-bodied flavor of the food, promotes the volatilization of the aroma thereof, prevents the deterioration in the flavor of the food and activates the original flavor of the food without injuring the original flavor of the food. Namely, it is a flavor-modifying substance having composite functions.

However, the above-mentioned compound is a highly unstable compound from the chemical viewpoint which is liable to undergo heat decomposition or oxidation with air, highly soluble in water and polymerized by heating under alkaline or acidic conditions [Beilstein Handbuch der Organischen Chemie, EIII, 1, 3310–3312]. Furthermore, it can hardly be analyzed and easily adsorbed by an ion exchange resin. Accordingly, it is unavoidable at present that the compound contained in foods obtained from natural substances such as underground water and fruit juice is reduced or lost with an increase in the number of processing or cooking procedures (for example, purification of drinking water with the use of ion exchange resins, extraction and concentration of various fruit juice or food materials, pasteurization of foods and drinks). As a result, its effect of expressing saltiness is deteriorated, which makes it necessary to increase the salt content of a food. Further, it is unavoidable at present that the flavor of the food is deteriorated thereby.

It is effective for human health to reduce the salt content in a food by enhancing the expression of saltiness. Thus there have been proposed a number of salt-reducing formulations and additives having an effect of reducing salt content. However, there has never been reported hitherto any compound which not only maintains a preferable intensity of saltiness of any food (for example, drinking water, drinks, fruit juices), even though the salt content of the food is reduced, but also imparts to and enhances the full-bodied flavor of the food, promotes the volatilization of the aroma thereof, prevents the deterioration in the flavor of the food and activates the original flavor of the food via synergistic effects of modifying the sourness and/or the saltiness without injuring the original flavor of the food, namely, a flavor-modifying substance having composite functions.

As described above, the compound according to the present invention is unstable to heat and air, highly soluble in water and exists in a complicated state in a solution. Although it is contained as a decomposition product of monosaccharides and polysaccharides in underground water, fruit juices and flavors and seasoning liquors obtained from natural materials, it is therefore unavoidable at present that the compound contained in foods is reduced or lost with an increase in the number of processing or cooking procedures (for example, cooking, pasteurization, purification with the use of ion exchange resins, solvent extraction, membrane concentration, distillation concentration, washing). As a result, its effect of expressing saltiness is deteriorated, which makes it necessary to increase the salt content of a food. Further, it is unavoidable at present that the flavor of the food is deteriorated thereby.

A flavor-modifying substance, whereby these problems can be solved, should be an odorless, single substance capable of modifying and enhancing saltiness, imparting to and modifying a full-bodied flavor and promoting the volatilization of an aroma without deteriorating the original flavor of the food by evolving any offensive odor or taste or injuring human health. However, publicly known substances capable of enhancing saltiness are frequently accompanied by offensive taste or odor, since some of the functions of sweeteners are utilized therefor or such substances are provided in the form of a mixture. On the other hand, publicly known substances capable of imparting a full-bodied flavor are provided not as a single substance but as a mixture. Thus, no single compound capable of expressing a full-bodied flavor has been identified so far. In addition, the titers of such substances are restricted by the starting materials, production methods and utilization methods. Further, a mixture frequently has an offensive taste or odor, which makes it hardly applicable to drinking water, drinks and fruit juices of the popular type.

A flavor obtained from a natural material and containing said compound as a constituent has a limited titer and an intense aroma which restricts the application range thereof as a general-purpose flavor-modifying substance.

That is to say, each of the publicly known saltiness-enhancing substances and full-bodied flavor-imparting ones mainly aims at enhancing saltiness or expressing a full-bodied flavor and none of them is a flavor-modifying substance capable of activating the original flavor of a food and exhibiting composite functions.

The present inventors halve developed a method for producing an aroma aqueous solution component which comprises indirectly heating a mixture consisting of fresh coffee beans, aracha (coarse tea leaves), cacao and shell in a stream of a mixed gas comprising an inert gas and superheated steam [refer to JP-A-61-70944, JP-A-6-119140, and JP-B-61-108351, the term "JP-B" as used herein means an "examined Japanese patent publication"] and conducted extensive studies on a substance capable of expressing a full-bodied flavor in this method. As a result, they have found that the compound as mentioned above has functions of imparting a full-bodied flavor, modifying sourness and/or saltiness and promoting the volatilization of an aroma thereof, thus completing the present invention.

SUMMARY OF THE INVENTION

Accordingly, the present invention provides a method for improving the flavor of a drink or a food which comprises adding at least one compound selected from among monomers and polymers of triose-reductone, hydroxymalondialdehyde and hydroxypyruvaldehyde to the drink or food at a rate of from 50 to 10,000 ng per gram of the drink or food.

DETAILED DESCRIPTION OF THE INVENTION

The above-mentioned compound to be used in the present invention is a safe substance which can be obtained as a component of foods or blackstrap molasses or as an alkali decomposition product of monosaccharides and polysaccharides. It can be easily obtained as a single substance by isolating and purifying the same from a saccharide decomposition product or by chemically synthesizing the same. Further, the compound of the present invention is odorless at an addition level as a single compound or a mixture and the addition level can be arbitrarily controlled.

The addition of the compound of the present invention to any salty food makes it possible to maintain the inherent intensity of the saltiness even though the salt content of the food is reduced. Thus, it contributes to the prevention of excessive intake of salt. Furthermore, the compound of the present invention modifies the sourness of a food into a full-bodied and sharp one, imparts to or enhances a full-bodied flavor via synergistic effects of modifying and enhancing saltiness and/or sourness and promotes the volatilization of an aroma thereof to thereby activate the delicious flavor of the food without deteriorating the original flavor of the food.

Particular examples of the compound of the present invention include one or more compounds selected from among monomers and polymers of triose-reductone, hydroxypyruvaldehyde and hydroxymalondialdehyde. Further, triose-reductone salts with sodium, potassium, magnesium and calcium and mixtures of triose-reductone with sodium, potassium, magnesium and calcium ions are usable therefor. These compounds may be combined together with other known flavor-modifying substance(s) (e.g., hydroxyacetaldehyde, acetol, and acetoin, etc.) and added either as such or as a solution to drinking water, drinks or foods containing water.

The compound of the present invention has a specific and characteristic function of enhancing the expression of the saltiness of a food by making the saltiness prominent or modifying the same into a heavy one having an aftertaste.

The addition level of the compound of the present invention may preferably range from 50 to 10,000 ng per gram of the drink or the food. When it is added at a concentration falling within the range as specified above, it modifies and enhances the saltiness of a salty food and imparts a full-bodied and sharp sourness just like umeboshi does to a sour food. Further, it imparts to and enhances a full-bodied flavor via synergistic effects of modifying and enhancing the saltiness and/or the sourness, promotes the volatilization of an aroma and prevents the deterioration of the aroma by an antioxidant action, thus activating the original flavor of the food.

The addition level of the compound of the present invention as specified above is determined on the weight basis, regardless of the form (monomer, polymer or alkali salt) of the compound. The sourness of triose-reductone is never expressed within the addition range as specified above. When the compound of the present invention is combined with other substances such as the above-mentioned known flavor-modifying substances, the addition level is determined based on the total weight of these compounds.

The optimum addition level varies from food item to food item. Therefore, it is required to determine the optimum addition level for each item by preparing samples differing in addition level from each other and comparing these samples in a sensory test. When the compound of the present invention is added in an amount exceeding the upper limit of the suitable addition level, the characteristic taste and saltiness of the item gradually go down and the taste is weakened. When the compound of the present invention is added in an amount smaller than the lower addition level, on the other hand, the saltiness and full-bodied flavor achieved in the suitable addition range are weakened. The volatilization of an aroma is improved as the addition level decreases within the suitable range of the addition level. When the above-mentioned known flavor-modifying substances are used together, saltiness is modified into a mild, sweet and heavy taste, or the taste is thickened and the full-bodied flavor is enriched.

Since the compound of the present invention is unstable to heat and air when employed either alone or as a mixture (including mixtures of the compound of the present invention with the above-mentioned known flavor-modifying substances, the same will apply hereinafter), it is preferable to add it at the final processing stage and perform no open-air heating treatment after the addition of said compound. When treatments such as pasteurization or cooking are to be performed after adding the compound, the addition level should be determined by taking the decomposition loss of the compound into consideration. When the above-mentioned known flavor-modifying substances are used together with the compound of the present invention, the decomposition of the compound sometimes varies depending on the form, composition and acidity thereof. It is therefore important not only to consider delicate differences in flavor but also to select compound(s) which relatively scarcely undergo decomposition.

The compound of the present invention has a structure wherein a hydroxyl group is located adjacent to a carbonyl group and is highly soluble in water, soluble in water-soluble solvents such as ethanol but hardly soluble in organic solvents such as ether. As described above, the compound of the present invention is liable to be oxidized, easily decomposes due to heat or light, easily undergo polymerization, is chemically unstable and easily adsorbed by ion exchange resins. In particular, triose-reductone reduces; silver, bromine and iodine ions in solutions and shows a high reduction ability comparable to that of ascorbic acid [Nogei Kagaku Kaishi, 46, 137–145 (1972)]. Accordingly, triose-reductone also has a function as an antioxidant whereby the deterioration of the flavor of a food due to the oxidation of flavor components easily undergoing oxidation can be prevented.

The compound of the present invention is contained in blackstrap molasses [Seito Gijutsu Kenkyu Kaishi, 22, 65–76 (1970)]. It can be obtained as a single and pure compound by isolation as an alkali decomposition product of saccharides such as glucose [B. Eistert, F. Arnemann, F. Haunder, Chem. Ber., 88, 953 (1955)] or synthesis [for example, G. Hesse, F. Ramissch, K. Kennet, Chem. Ber., 89, 2142–2143 (1956)]. It is a substance which we have been taking everyday.

Although it is considered that the above-mentioned compound according to the present invention is contained in underground water, fruit juices and flavors and seasoning liquors obtained from natural materials as a decomposition product of monosaccharides or polysaccharides, it is an unstable substance, as discussed above. Therefore, the content of this compound is reduced to the lower limit of the addition level (50 ng/g) as specified in the present invention or below, as the number of processing treatments (for example, cooking, pasteurization, desalting with ion exchange resins, solvent extraction, membrane concentration, distillation concentration, washing) increases. As a result, the effect of expressing saltiness is deteriorated. Thus, it is unavoidable that the amount of salt to be used in food processing is elevated, the full-bodied flavor and deliciousness of the food become poor and the flavor of the food is deteriorated.

Accordingly, the addition of the compound of the present invention to drinking water, drinks and any water-containing foods makes it possible to activate the original flavors of the foods. Further, this compound can make the saltiness of a food prominent or modify the same into a heavy one having an aftertaste to thereby enhance the expression of the saltiness. Therefore, the addition of this compound makes it possible to reduce the salt content of a food while maintaining the saltiness at a desirable level, thus preventing excessive intake of salt.

The compound of the present invention may be used as a single compound or as a mixture containing the same. When combined with at least one of the above-mentioned flavor-modifying substances which have been previously developed by the present inventors, it is usable as a flavor-modifying substance of an elevated titer. That is to say, the flavor-modifying substances developed before have characteristic functions of modifying a saltiness into a full-bodied and mild one. However, they cannot enhance the expression of the saltiness by making it prominent or modifying the same into a heavy one having an aftertaste.

When the compound of the present invention is combined with one or more of these flavor-modifying substances, the saltiness is enhanced by said compound and modified into a mild one by the flavor-modifying substance(s). Thus a flavor having a further enriched full-bodied flavor and improved volatilization of aroma can be obtained.

The physiological mechanism of such a change in flavor caused by the addition of a trace amount of the compound of the present invention has never been clarified in detail so far. It is considered that metal ions such as sodium ion and acid protons contained in a foods are felt as a sourness or a saltiness when coordinated in water molecule. On the other hand, it is known that a monosaccharide, which is a polyhydroxy compound, suffers from a replacement of a proton in a hydroxyl group with a metal ion to thereby form a salt or two or three hydroxyl groups adjacent to each other in a saccharide molecule form a complex together with mono- to tri-valent metal ions in an aqueous solution [Adv. in Carbohydr. Chem. & Biochem., 47, 1–43 (1989)].

Also, it has never been revealed which compound, from among those existing in a solution, participates in the functions relating to the saltiness, sourness and full-bodied flavor and promotes the volatilization of an aroma. Although ascorbic acid has the same enol structure as triose-reductone, it scarcely shows any function of enhancing saltiness or promoting the volatilization of an aroma. Further, the compound of the present invention differs from the above-mentioned known flavor-modifying substances in the expression of saltiness. Therefore, it seems that the resonance hybrid (1) of triose-reductone is important. One proton in the resonance hybrid (1) is easily substituted with a sodium ion to thereby form a monosodium salt. It also forms salts together with mono- to tri-valent metal ions. Accordingly, the mechanism of expressing a saltiness, a sourness and a full-bodied flavor and the improvement in the volatilization of an aroma by the resonance hybrid (1) seemingly proceed as follows.

It is assigned that the saltiness is felt in such a manner. Two hydroxyl groups forming an intramolecular hydrogen bond in the resonance hybrid (1) are substituted or coordinated with metal ions such as sodium ions in a food, thus elevating the apparent sodium icon concentration. As a result, the saltiness becomes prominent or an intense and heavy saltiness having an aftertaste is noticed.

On the other hand, the sourness is felt in such a manner. Two hydroxyl group protons forming an intramolecular hydrogen bond in the resonance hybrid (1) undergo rapid proton exchange with acid proteins contained in a food or hydroxyl groups form a complex together with acid protons. As a result, the sourness due to acetic acid or citric acid is noticed as a full-bodied and sharp sourness just like umeboshi. It is further assumed that the full-bodied flavor is felt as a result of synergistic effects of the protons and sodium ions existing in the above-mentioned state.

Furthermore, it is assumed that the improvement in the volatilization of the aroma proceeds as follows. Namely, hydroxyl groups foaming intramolecular hydrogen bonds in the resonance hybrid (1) affect hydrogen bonds of water molecules and thus weaken the interaction between aroma components and water molecules to thereby elevate the volatility of the aroma components.

Thus, the saltiness expression mechanism of the compound of the present invention in a solution differs from those of the above-mentioned known flavor-modifying substances. However the mechanisms of the loaner compound of expressing a sourness and a full-bodied flavor and improving the volatilization of an aroma are similar to those of the latter ones.

The interactions between the above-mentioned compound in a solution of said compound alone or a mixture thereof together with other substances and metal ions such as sodium ions and/or protons are liable to be affected by other adjacent molecules including water molecules. Further, the degree of the modification of the saltiness and/or the sourness, the intensity of the full-bodied flavor and the degree of the improvement of the volatilization of the aroma are delicately affected by the state oil the substances constituting the food and the temperature. Namely, it is considered that changes in the qualities of the saltiness, the degree of the enhancement, changes in the sourness and the intensity of the full-bodied flavor delicately vary depending on the type of the food or the drink and the material temperature thereof.

When the function of the invention compound on saltiness is to be utilized, it is often observed that the saltiness of a highly salty food or a food containing a large amount of salt becomes out of balance, since the saltiness is made very prominent and too intense or the aftertaste strongly remains for an excessively longer period of time. In such a case, it is important to control the formulation relating to the flavor such as salt content after adding said compound, either alone or as a mixture, in an appropriate step during the production process of the food so as to give a flavor having a desirable saltiness.

Thus, a salt-reduced flavor maintaining a preferable intensity of saltiness, having a full-bodied flavor and showing an improved volatilization of an aroma can be achieved. The functions of said compound relating to the sourness and full-bodied flavor never makes the flavor of a food out of balance. In order to enhance the expression of saltiness or to mainly reduce the salt content, the above-mentioned compound is added either alone or in the form of a mixture which preferably contains 50% or more of triose-reductone.

As alkali salts of triose-reductone, sodium, potassium, magnesium and calcium chlorides, carbonates, hydroxides and organic acid salts may be cited. For example, triose-reductone may be used in the form of an isolated monoalkali salt or a solution prepared by adding one molar equivalent or less, based on triose-reductone, of caustic soda to an aqueous triose-reductone solution.

In general, the compound of the present invention is dissolved in water or a water-soluble solvent approved for edible use (for example, ethanol) and used as a solution. It is also possible that this compound is not diluted but added as such, either alone or as a mixture, and uniformly dissolved or mixed. Alternately, it may be added and employed as one of the components of a flavor or a seasoning liquor having water or ethanol as a solvent. When this compound is used as a component of a flavor or a seasoning liquor, its concentration is determined by taking the dilution ratio and the decomposition loss of said compound into consideration. A concentration of 0.1% by weight at a dilution ratio of 1/1000 may be cited by way of indication.

When used as an aqueous solution of a concentration of 0.1% by weight or below, the compound of the present invention is almost odorless. When it is needed, in particular, to use an odorless compound (for example, for imparting a full-bodied flavor to tap water or a drink), this compound, which gives no organoleptically detectable flavor within a range (50 to 10,000 ng/g) required for achieving effective addition, either as a single compound or as a mixture, can be arbitrarily selected and employed in order to enrich the original saltiness of a food or to activate the original and preferable flavor.

The compound of the present invention is usable in drinks and foods prepared by reconstituting a concentrated extract, sauces, various drinks such as fruit juice, coffee, black tea, barley tea, oolong tea and cocoa, pre-cooked foods products such as retort-packed foods and prepared dishes, cakes, baked products and frozen sweets. Further, it can be added to all foods containing water including liquors such as sake, beer and whisky, drinking water such as mineral water and seasonings such as a dressing, vinegar and soy sauce.

To further illustrate the present invention in greater detail, and not by way of limitation, the following examples will be given.

EXAMPLE 1

0.1 g of triose-reductone was dissolved in distilled water to thereby give a total weight of 100 g. The obtained solution was added to a 0.5% by weight aqueous solution of salt at ratios of 1/50 (corresponding to 20,000 ng/g), 1/100, 1/500, 1/1,000, 1/2,000, 1/4,000, 1/5,000, 1/6,000 and 1/8,000 (corresponding to 125 ng/g). Further, one with no triose-reductone added was used as a control. Then an addition level giving an intense saltiness was evaluated by 5 well-trained panelists.

As a result, these 5 panelists agreed with each other in that the test samples of 1/50 to 1/100 showed a weak saltiness compared with the control one; that those of 1/500 to 1/2,000 showed a strong saltiness compared with the control one; and that those of 1/4,000 to 1/8,000 could not be distinguished from the control one. Based on these results, it was judged that an addition Level of from 1/500 to 1/2,000 (corresponding to 2,000 to 500 ng/g) was the most preferable for enhancing the saltiness of the 0.5% by weight aqueous solution of salt.

EXAMPLE 2

By using distilled water, distilled water samples, a 0.5% by weight aqueous solution of salt and a 0.05% by weight aqueous solution of citric acid were prepared. 1,000 ng/g portions of triose-reductone or triose-reductone monosodium salt were added to these solutions. Further, without triose-reductone or triose-reductone monosodium salt samples were prepared as a control. Then the taste of each sample was evaluated by 10 well-trained panelists. Regarding water, a sample showing a full-bodied flavor was selected. Regarding saltiness, a sample showing an intense saltiness and an aftertaste was selected. Regarding sourness, a sample showing a sharp sourness was selected. Table 1 summarizes the results. The triose-reductone monosodium salt was added by dissolving 100 mg of triose-reductone in 89.2 g of distilled water, adding 10.8 g of 0.1N NaOH (corresponding to ½ equivalent to triose-reductone) to thereby give 100 g of a solution and adding 0.1 g (corresponding to 1,000 ng/g) of the obtained solution.

TABLE 1

| Triose-reductone | Body (distilled water) | Saltiness (salt) | Sourness (citric acid) |
| --- | --- | --- | --- |
| (Paired Sample) | | | |
| added | 8 | 9 | 8 |
| non-added | 2 | 1 | 2 |
| Na salt: | | | |
| (Paired Sample) | | | |
| added | 8 | 7 | 7 |
| non-added | 2 | 3 | 3 |

The results given in Table 1 indicate that triose-reductone and its Na salt have functions of imparting a full-bodied flavor to water, enhancing saltiness and modifying the sourness of citric acid into a sharp one. The total evaluation of the additives, namely, triose-reductone and its Na salt by the panelists is as follows. Regarding saltiness, triose-reductone enhanced the saltiness and gave an intense aftertaste, while its Na salt enhanced the saltiness but gave little aftertaste. Regarding sourness, triose-reductone made the sourness sharp and thick, while its Na salt made the sourness sharp and rich but less thick. In the case of the distilled water, triose-reductone imparted a full-bodied and thick flavor, while its Na salt imparted a full-bodied but less thick flavor.

EXAMPLE 3

1,000 ng/g portions of triose-reductone were added to marketed miso (soybean paste), soy sauces (light-colored, dark), sauces (Worcestershire sauce, sauce being enriched with vegetables and fruits called "Tonkatsu" sauce) and tomato juice. Samples without triose-reductone were prepared as a control. Then, samples showing an intense saltiness and a prominent aroma were selected by 10 panelists. Table 2 summarizes the results. To the soy sauces (light-colored, dark), were added 0.1 g portions of a solution obtained by dissolving 0.1 g of ascorbic acid in 100 g of distilled water (corresponding to 1,000 ng/g) and the results thus obtained were expressed in *.

TABLE 2

| | Intense saltiness (Paired Sample) | | Prominent aroma (Paired Sample) | |
| --- | --- | --- | --- | --- |
| | Added | Non-added | Added | Non-added |
| Miso (soybean paste) | 10 | 0 | 9 | 1 |
| Soy sauce | | | | |
| (light-colored) | 10 | 0 | 10 | 0 |
| (dark) | 10 | 0 | 10 | 0 |
| Sauce (Worcestershire) | 9 | 1 | 10 | 0 |
| (Tonkatsu) | 8 | 2 | 10 | 0 |
| Tomato juice | 7 | 3 | 8 | 2 |
| Soy sauce* | | | | |
| (light-colored) | 6 | 4 | 5 | 5 |
| (dark) | 5 | 5 | 6 | 4 |

As Table 2 shows, triose-reductone remarkably changed the saltiness of each tested food, enhanced its saltiness and improved the volatilization of its aroma. On the other hand, it was judged that the addition of ascorbic acid scarcely enhanced the saltiness or improved the volatilization of the aroma. The total evaluation of the additives by the panelists is as follows. Regarding the soy sauces, the saltiness became prominent and too strong, thus making the flavor out of balance, which means that the salt content should be reduced. In the case of miso, a heavy saltiness having an aftertaste became too strong and thus the flavor was out of balance, which also means that the salt content should be reduced. In the case of the sauces (Worcestershire sauce, Tonkatsu sauce), the heavy saltiness having an aftertaste was not so prominent as in the case of miso, though the salt content should be reduced. Tomato juice showed a change in taste similar to the one obtained by adding salt to the control sample, namely, the saltiness and full-bodied flavor were enhanced while the sourness was weakened.

EXAMPLE 4

Combination of the Compound of the Present Invention with the Prior Art Flavor-Modifying Substances 100 mg of a mixture comprising 50% by weight of triose-reductone, 30% by weight of hydroxyacetaldehyde and 20% by weight of acetol was dissolved in 100 g of distilled water. The obtained solution was added to a marketed canned black tea product at ratios of 1/50 (corresponding to 20,000 ng/g), 1/100, 1/500, 1/1,000, 1/2,000, 1/4,000 and 1/5000 (corresponding to 200 ng/g). Further, a control with no additives was used. The tastes of these samples were evaluated by 5 well-trained panelists.

As a result, these 5 panelists agreed with each other that the samples of 1/50 to 1/1000 showed an intense sweetness, a suppressed astringency, weakened characteristics of black tea and a full-bodied flavor; that those of 1/500 to 1/2,000 showed appropriately suppressed astringency and bitterness, a full-bodied flavor and a delicious taste; that those of 1/4,000 to 1/5,000 showed an astringency comparable to the control but a weak full-bodied flavor; and that the volatilization of the aroma was promoted as the addition level decreased. Based on these results, it was judged that an addition level of from 1/500 to 1/2,000 (corresponding to 200 to 500 ng/g) gave the most preferable flavor of the marketed black tea products.

EXAMPLE 5

Combination of the Compound of the Present Invention with the Prior Art Flavor-Modifying Substances 100 mg of a mixture comprising 50% by weight of triose-reductone, 30% by weight of hydroxyacetaldehyde and 20% by weight of acetoin was dissolved in 100 g of distilled water. 0.1 g portions (corresponding to 1,000 ng/g) of the obtained solution were added to 100 g portions of marketed canned drinking water, marketed canned coffee, marketed canned sake, marketed canned beer and marketed reconstituted orange juice. Further, samples without additives were prepared as a control. Preferred products and better aroma were selected by 10 panelists. Table 3 summarizes the results.

TABLE 3

| | Preferred (Paired Sample) | | Better aroma (Paired Sample) | |
| --- | --- | --- | --- | --- |
| | Added | Non-added | Added | Non-added |
| Drinking water (underground water) | 8 | 2 | — | — |
| Coffee | 9 | 1 | 10 | 0 |
| Japanese sake | 8 | 2 | 10 | 0 |
| Beer | 7 | 3 | 6 | 4 |
| Ponzu** | 9 | 1 | 10 | 0 |
| Reconstituted orange juice | 10 | 0 | 10 | 0 |

**vinegar containing soysauce and/or citrus juice

The results given in Table 3 indicate that the compounds of the present invention can impart a preferable full-bodied flavor to various food in common when used as a combination with other flavor-modifying substances. The total evaluation of the additives is as follows. In the case of the reconstituted orange juice, a fresh flavor was activated and a thick and full-bodied soberness was obtained. The coffee showed a clear feel of coffee and milk and a full-bodied flavor. The ponzu showed a fresh and full-bodied sourness.

According to the present invention, the addition of at least one compound selected from among monomers and polymers of triose-reductone, hydroxymalondialdehyde and hydroxypyruvaldehyde to a drink or a food at a specific ratio makes it possible to enhance the saltiness of said food, to modify its sourness, to impart to and enhance its full-bodied flavor and to improve the volatilization of its aroma, thus improving the flavor of the food. It is also possible thereby to prevent a deterioration in flavor.

While the invention has been described in detail and with reference to specific embodiments thereof, it will be apparent to one skilled in the art that various changes and modifications can be made therein without departing from the spirit and scope thereof.

What is claimed is:

1. A method for enhancing the expression of saltiness of a food or drink which comprises adding to the food or drink at least one substantially pure compound selected from the group consisting of monomers and polymers of triose-reductone, hydroxymalondialdehyde, hydropyrvaldehyde, and mixtures thereof at a ratio of from 50 to 10,000 ng per gram of the food or drink.

2. A method as claimed in claim 1, wherein said compound is selected from among sodium, potassium, magnesium and calcium salts and mixtures with sodium, potassium, magnesium and calcium ions.

3. A method as claimed in claim 1, wherein said at least one substantially pure compound is added to said drink or food as a solution in water or a water-soluble solvent.

* * * * *